(12) United States Patent
Aksoy et al.

(10) Patent No.: US 9,984,507 B2
(45) Date of Patent: May 29, 2018

(54) EYE TRACKING FOR MITIGATING VERGENCE AND ACCOMMODATION CONFLICTS

(71) Applicant: Oculus VR, LLC, Menlo Park, CA (US)

(72) Inventors: Volga Aksoy, Redwood City, CA (US); Yury Anatolievich Petrov, Coto de Caza, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 14/946,143

(22) Filed: Nov. 19, 2015

(65) Prior Publication Data
US 2017/0148215 A1    May 25, 2017

(51) Int. Cl.
*G09G 5/00*      (2006.01)
*G06T 19/00*     (2011.01)
*G06F 3/01*      (2006.01)
*G02B 27/01*     (2006.01)

(52) U.S. Cl.
CPC ........ *G06T 19/006* (2013.01); *G02B 27/0172* (2013.01); *G06F 3/013* (2013.01); *G02B 2027/0132* (2013.01); *G02B 2027/0187* (2013.01)

(58) Field of Classification Search
CPC .............................. G06T 19/006; G06T 19/00
USPC ........................................................ 345/633
See application file for complete search history.

(56) References Cited

U.S. PATENT DOCUMENTS

| 2002/0109701 | A1* | 8/2002 | Deering | G06T 15/00 345/581 |
| 2006/0232665 | A1* | 10/2006 | Schowengerdt | G02B 27/0093 348/51 |
| 2011/0075257 | A1* | 3/2011 | Hua | G02B 27/017 359/464 |
| 2012/0236031 | A1* | 9/2012 | Haddick | G02B 27/0093 345/633 |
| 2013/0300634 | A1* | 11/2013 | White | G02B 27/0075 345/7 |
| 2013/0300635 | A1* | 11/2013 | White | H04N 13/0484 345/7 |

(Continued)

OTHER PUBLICATIONS ("Vergence—accommodation conflicts hinder visual performance and cause visual fatigue". David Hoffman, Ahna Girshick, Kurt Akeley, and Martin Banks. Journal of Vision, 2008.*

(Continued)

*Primary Examiner* — Jin Ge
(74) *Attorney, Agent, or Firm* — Fenwick & West LLP (57) ABSTRACT

A headset (e.g., VR headset or AR headset) displays a three-dimensional (3D) virtual scene and includes a distance element to dynamically adjust a distance between an optics block and an electronic display included in the headset based on a location in the virtual scene where the user is looking. The headset tracks the user's eyes to approximate gaze lines and determines a plane of focus for a frame of the virtual scene as the intersection of the gaze lines. The distance element adjusts a distance between an optics block and an electronic display so that the optics block is focused at the plane of focus, which keeps the user's eyes in a zone of comfort as vergence and accommodation change.

20 Claims, 6 Drawing Sheets

(56) References Cited

U.S. PATENT DOCUMENTS

| | | | | |
|---|---|---|---|---|
| 2013/0335404 A1* | 12/2013 | Westerinen | ............ | G06F 3/033 345/419 |
| 2014/0347361 A1* | 11/2014 | Alpaslan | ................ | G06T 15/50 345/426 |
| 2015/0049114 A1* | 2/2015 | Geisner | ................ | A63F 13/216 345/633 |
| 2015/0237336 A1* | 8/2015 | Sylvan | ............... | H04N 13/0429 348/54 |
| 2015/0288944 A1* | 10/2015 | Nistico | ............. | H04N 13/0022 345/156 |
| 2016/0062121 A1* | 3/2016 | Border | ............... | G02B 27/0172 359/630 |
| 2016/0131912 A1* | 5/2016 | Border | ............... | G02B 27/0176 345/8 |
| 2016/0260258 A1* | 9/2016 | Lo | ............................ | G06T 7/00 |

OTHER PUBLICATIONS

K. J. MacKenzie, "Vergence and accommodation to multiple-imageplane stereoscopic displays: 'real world' responses with practical image-plane separations?," J. Electron. Imag., vol. 21, No. 1, p. 011002, Jan. 2012.*

T. Shibata, T. Kawai, K. Ohta, M. Otsuki, N. Miyake, Y. Yoshihara, and T. Iwasaki, "Stereoscopic 3-D display with optical correction for the reduction of the discrepancy between accommodation and convergence," J. Soc. Inf. Disp. 13, 665-671 (2005).*

S. Shiwa, K. Omura, and F. Kishino, "Proposal for a 3-D display with accommodative compensation: 3-DDAC," J. Soc. Inf. Disp. 4, 255-261 (1996).*

Rodriguez, J., "Volumetric World Display," Thesis, Stanford, May 15, 2012, 21 pages.

\* cited by examiner

(Real World)

FIG. 4A

(Conventional Head-mounted Display)

FIG. 4B (Frame n)

FIG. 5A (Frame n+1)

EYE TRACKING FOR MITIGATING VERGENCE AND ACCOMMODATION CONFLICTS

BACKGROUND

The present disclosure generally relates to eye tracking, and specifically to mitigate vergence and accommodation conflicts.

Head mounted displays (HMDs) may be used to present augmented and/or virtual information to a user. For example, a virtual reality (VR) headset can be used to simulate virtual environments. Conventionally, a HMD presents stereoscopic images on an electronic display inside the HMD to simulate the illusion of depth and head tracking sensors estimate what portion of the virtual environment is being viewed by the user. However, conventional HMDs are often unable to compensate for vergence and accommodation conflict when rendering content, which may cause double vision, visual fatigue, and nausea in users.

SUMMARY

A HMD such as a VR headset displays a three-dimensional (3D) virtual scene and includes a distance element (e.g., an element that mechanically changes a distance between a lens system and a display screen) to dynamically adjust a distance between an optics block and an electronic display included in the HMD to direct light from the screen towards the user's eyes based on a location in a virtual or augmented scene where the user is looking. For example, the HMD includes a module that tracks a user's eyes to approximate gaze lines and the estimated point of intersection of the gaze lines, which is referred herein as a vergence depth that defines the user's plane of focus for a particular frame of the virtual scene presented by the HMD. Under normal conditions when a user is viewing an object, human eyes automatically adjust themselves to cause vergence and accommodation such that the vergence depth matches the focal length of the eyes. Vergence is the simultaneous movement or rotation of both eyes in opposite directions to obtain or maintain single binocular vision and is connected to accommodation of the eyes, and accommodation occurs when the eyes are focused on an object being viewed by the user. Under normal conditions, changing the focus of the eyes to look at an object at a different distance automatically causes vergence and accommodation. In some cases, there is a difference between the vergence depth and focal length such that the user's eyes cannot verge and accommodate at the same time, which is referred herein as a "vergence-accommodation conflict."

Based on the estimated vergence depth, the distance element adjusts the distance between the optics block and the electronic display to focus the optics block at the estimated vergence depth, and keeps the user's eyes in a zone of comfort as vergence depth and accommodation change. For example, the distance element changes the position of either the electronic display or the optics block based on the estimated vergence depth to adjust the distance between the optics block and the electronic display. The distance element can change the position of the electronic display or the optics block based on a lookup table, where the lookup table comprises a mapping between various vergence depths and object distances, where an object distance represents a distance between the optics block and a virtual object currently being viewed by the user within the virtual scene.

In some cases, gaze lines do not intersect and are an approximation based on the location of the user's eyes. In such cases, the vergence depth estimated from the gaze lines may be further refined or filtered using geometric data for the virtual scene presented by the HMD. While it might be useful to refine or filter the estimated vergence depth to calculate the true vergence depth by, for example, refining or filtering using geometric data, any such refining or filtering of the estimated vergence depth takes up additional resources and timing budget. In some embodiments, the HMD system mitigates the vergence-accommodation conflict using the estimated vergence depth without refining or filtering using geometric data for the virtual scene. In such embodiments, an actuation time for the motors controlling the distance between the electronic display and the optics block is reduced.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
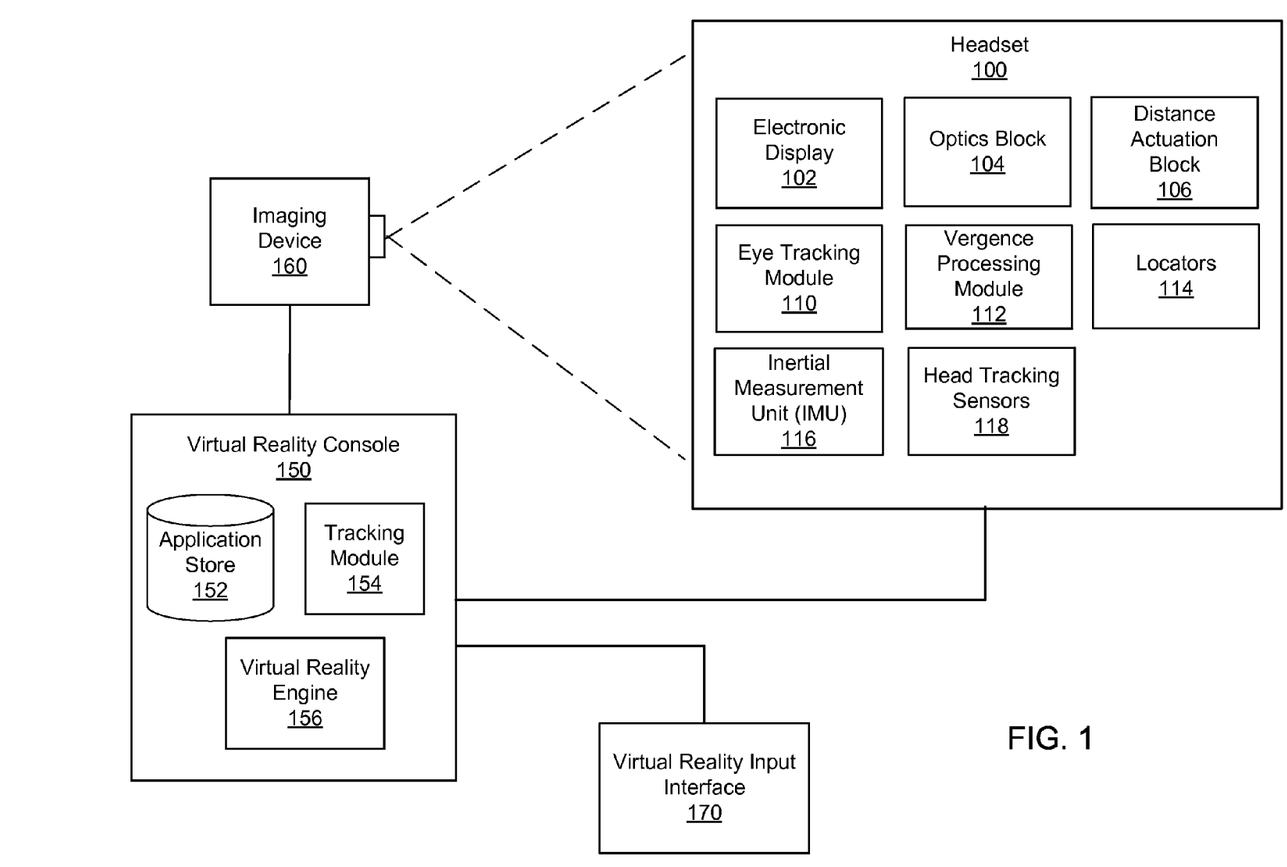
FIG. 1 shows an example VR system, in accordance with at least one embodiment.

FIG. 1 is a VR system environment in which a VR console 150 operates. In this example, the VR system environment includes headset 100, imaging device 160, and VR input interface 170, which are each coupled to VR console 150. While FIG. 1 shows a single headset 100, a single imaging device 160, and a single VR input interface 170, in other embodiments, any number of these components may be included in the system. For example, there may be multiple headsets 100 each having an associated VR input interface 170 and being monitored by one or more imaging devices 160, with each headset 100, VR input interface 170, and imaging devices 160 communicating with the VR console 150. In alternative configurations, different and/or additional components may also be included in the VR system environment. While system environment of FIG. 1 is described in a VR context, the system environment of FIG. 1 may also be part of other HMD systems such as, for example, an AR system environment.

Headset 100 is a Head-Mounted Display (HMD) that presents content to a user. Example content includes images, video, audio, or some combination thereof. Audio content may be presented via a separate device (e.g., speakers and/or headphones) external to headset 100 that receives audio information from headset 100, VR console 150, or both. Headset 100 includes electronic display 102, optics block 104, distance actuation block 106, eye tracking module 110, vergence processing module 112, one or more locators 114, internal measurement unit (IMU) 116, and head tracking sensors 118. In some embodiments, the headset 100 may act as a VR headset or an augmented reality (AR) headset. While headset 100 is described in FIG. 1 in a VR context as part of a VR system environment, headset 100 may also be part of other HMD systems such as, for example, an AR system environment. In embodiments that describe AR system environment, headset 100 augments views of a physical, real-world environment with computer-generated elements (e.g., images, video, sound, etc.). An embodiment of headset 100 is further described below in conjunction with FIGS. 2A and 2B. Headset 100 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

Electronic display 102 displays images to the user in accordance with data received from the VR console 150. In various embodiments, electronic display 102 may comprise a single electronic display or multiple electronic displays (e.g., a display for each eye of a user). Examples of electronic display 102 include: a liquid crystal display (LCD), an organic light emitting diode (OLED) display, an active-matrix organic light-emitting diode display (AMOLED), some other display, or some combination thereof. In some embodiments, the position of the electronic display 102 can be changed to vary a distance between electronic display 102 and optics block 104 of the headset 100.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases, all of the user's field of view.

Optics block 104 may be designed to correct optical error, such as two-dimensional optical errors, three dimensional optical errors, or some combination thereof. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to electronic display 102 for display is pre-distorted, and optics block 104 corrects the distortion when it receives image light from electronic display 102 generated based on the content. In some embodiments, the position of the optics block 104 can be changed to vary a distance between electronic display 102 and optics block 104 of the headset 100.

Distance actuation block 106 includes a distance element that adjusts the location of electronic display 102 within the headset 100 to keep a user's eyes in a zone of comfort as vergence and accommodation change. In one embodiment, distance actuation block 106 physically changes the distance between electronic display 102 and optics block 104 by moving electronic display 102. Alternatively or additionally, distance actuation block 106 physically changes the distance between electronic display 102 and optics block 104 by moving optics block 104. Distance actuation block 106 may include actuators and/or motors that move electronic display 102 (or optics block 104) on a track to change the distance between electronic display 102 and optics block 104. In some embodiments, distance actuation block 106 may be separate from or integrated into optics block 104, electronic display 102, or some combination thereof.

Eye tracking module 110 tracks an eye position and eye movement of a user of headset 100. A camera or other optical sensor inside headset 100 captures image information of a user's eyes, and eye tracking module 110 uses the captured information to determine gaze lines of the user's eyes. In one example, infrared light is emitted within headset 100 and reflected from each eye. The reflected light is received or detected by the camera and analyzed to extract eye rotation from changes in the infrared light reflected by each eye. Many methods for tracking the eyes of a user can be used by eye tracking module 110. The position of the pupils of the user's eyes is tracked and used to determine gaze lines that identify a location or a position in a virtual scene presented by headset 100 where the user is looking. An example eye tracking system is described below in conjunction with FIG. 3.

Vergence processing module 112 calculates a vergence depth (or vergence distance) of a user's gaze when the user's eyes reach a state of vergence. Vergence is the simultaneous movement (e.g., rotation) of both eyes in opposite directions to maintain single binocular vision, which is naturally and automatically performed by the human eyes. Thus, a location where a user's eyes are verged is where the user is looking and is also typically the location where the user's eyes are focused (i.e., accommodation of the eyes). Vergence depth (or vergence distance) is defined as a distance between a location of the user's eyes and a location where the user's eyes reach the state of vergence. Vergence depth may be calculated by estimating intersection of the user's gaze lines as determined by eye tracking module 110. For example, vergence processing module 112 triangulates the gaze lines to estimate a distance or depth from the user's eyes associated with intersection of the gaze lines. The depth associated with intersection of the gaze lines can then be used as an approximation for the accommodation distance, which represents a distance from the user's eyes where the user's eyes are focused on. In some embodiments, vergence processing module 112 may be part of distance actuation block 106.

Locators 114 are objects located in specific positions on headset 100 relative to one another and relative to a specific reference point on headset 100. Locator 114 may be a light emitting diode (LED), a corner cube reflector, a reflective marker, a type of light source that contrasts with an environment in which headset 100 operates, or some combination thereof. Active locators 114 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 114 can be located beneath an outer surface of headset 100, which is transparent to the wavelengths of light emitted or reflected by locators 114 or is thin enough not to substantially attenuate the wavelengths of light emitted or reflected by locators 114. Further, the outer surface or other portions of headset 100 can be opaque in the visible band of wavelengths of light. Thus, locators 114 may emit light in the IR band while under an outer surface of headset 100 that is transparent in the IR band but opaque in the visible band.

IMU 116 is an electronic device that generates fast calibration data based on measurement signals received from one or more of head tracking sensors 118, which generate one or more measurement signals in response to motion of headset 100. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates fast calibration data indicating an estimated position of headset 100 relative to an initial position of headset 100. For example, head tracking sensors 118 include multiple accelerometers to measure translational motion (forward/back, up/down, left/right) and multiple gyroscopes to measure rotational motion (e.g., pitch, yaw, roll). IMU 116 can, for example, rapidly sample the measurement signals and calculate the estimated position of headset 100 from the sampled data. For example, IMU 116 integrates measurement signals received from the accelerometers over time to estimate a velocity vector and integrates the velocity vector over time to determine an estimated position of a reference point on headset 100. The reference point is a point that may be used to describe the position of headset 100. While the reference point may generally be defined as a point in space, in various embodiments, reference point is defined as a point within headset 100 (e.g., a center of the IMU 130). Alternatively, IMU 116 provides the sampled measurement signals to VR console 150, which determines the fast calibration data.

IMU 116 can additionally receive one or more calibration parameters from VR console 150. As further discussed below, the one or more calibration parameters are used to maintain tracking of headset 100. Based on a received calibration parameter, IMU 116 may adjust one or more IMU parameters (e.g., sample rate). In some embodiments, certain calibration parameters cause IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Imaging device 160 generates slow calibration data in accordance with calibration parameters received from VR console 150. Slow calibration data includes one or more images showing observed positions of locators 114 that are detectable by imaging device 160. Imaging device 160 may include one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. Slow calibration data is communicated from imaging device 160 to VR console 150, and imaging device 160 receives one or more calibration parameters from VR console 150 to adjust one or more imaging parameters (e.g., focal length, focus, frame rate, ISO, sensor temperature, shutter speed, aperture, etc.).

VR input interface 170 is a device that allows a user to send action requests to VR console 150. An action request is a request to perform a particular action. For example, an action request may be to start or end an application or to perform a particular action within the application. VR input interface 170 may include one or more input devices. Example input devices include a keyboard, a mouse, a game controller, or any other suitable device for receiving action requests and communicating the received action requests to VR console 150. An action request received by VR input interface 170 is communicated to VR console 150, which performs an action corresponding to the action request. In some embodiments, VR input interface 170 may provide haptic feedback to the user in accordance with instructions received from VR console 150. For example, haptic feedback is provided by the VR input interface 170 when an action request is received, or VR console 150 communicates instructions to VR input interface 170 causing VR input interface 170 to generate haptic feedback when VR console 150 performs an action.

VR console 150 provides content to headset 100 for presentation to the user in accordance with information received from imaging device 160, headset 100, or VR input interface 170. In the example shown in FIG. 1, VR console 150 includes application store 152, tracking module 154, and VR engine 156. Some embodiments of VR console 150 have different or additional modules than those described in conjunction with FIG. 1. Similarly, the functions further described below may be distributed among components of VR console 150 in a different manner than is described here.

Application store 152 stores one or more applications for execution by VR console 150. An application is a group of instructions, that when executed by a processor, generates content for presentation to the user. Content generated by an application may be in response to inputs received from the user via movement of headset 100 or VR interface device 170. Examples of applications include gaming applications, conferencing applications, video playback application, or other suitable applications.

Tracking module 154 calibrates the VR system using one or more calibration parameters and may adjust one or more calibration parameters to reduce error in determining position of headset 100. For example, tracking module 154 adjusts the focus of imaging device 160 to obtain a more accurate position for observed locators 114 on headset 100. Moreover, calibration performed by tracking module 154 also accounts for information received from IMU 116. Additionally, if tracking of headset 100 is lost (e.g., imaging device 160 loses line of sight of at least a threshold number of locators 114), tracking module 154 re-calibrates some or all of the VR system components.

Additionally, tracking module 154 tracks the movement of headset 100 using slow calibration information from imaging device 160 and determines positions of a reference point on headset 100 using observed locators from the slow calibration information and a model of headset 100. Tracking module 154 also determines positions of the reference point on headset 100 using position information from the fast calibration information from IMU 116 on headset 100. Additionally, tracking module 154 may use portions of the fast calibration information, the slow calibration information, or some combination thereof, to predict a future location of headset 100, which is provided to VR engine 156.

VR engine 156 executes applications within the VR system and receives position information, acceleration information, velocity information, predicted future positions, or some combination thereof for headset 100 from tracking module 154. Based on the received information, VR engine 156 determines content to provide to headset 100 for presentation to the user, such as a virtual scene. For example, if the received information indicates that the user has looked to the left, VR engine 156 generates content for headset 100 that mirrors or tracks the user's movement in a virtual environment. Additionally, VR engine 156 performs an action within an application executing on VR console 150 in response to an action request received from the VR input interface 170 and provides feedback to the user that the action was performed. The provided feedback may be visual or audible feedback via headset 100 or haptic feedback via VR input interface 170.

Figure 2A:
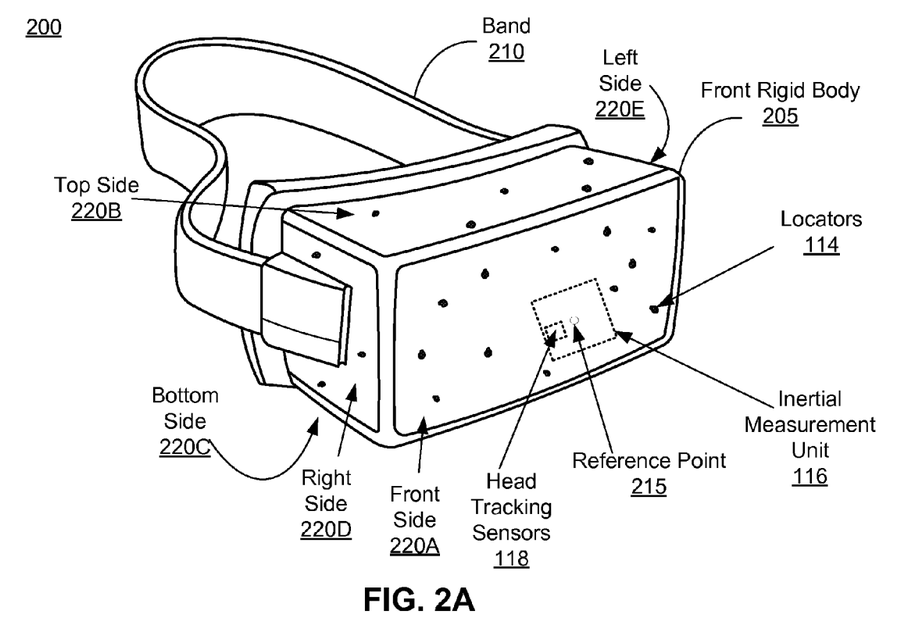
FIG. 2A shows a diagram of a VR headset, in accordance with at least one embodiment.

FIG. 2A is a diagram of VR headset 200, in accordance with at least one embodiment. VR headset 200 is an embodiment of headset 100, and includes front rigid body 205 and band 210 that goes around a user's head. Front rigid body 205 includes one or more electronic display elements corresponding to electronic display 102 (not shown in FIG. 2A), IMU 116, head tracking sensors 118, and locators 114. In this example, head tracking sensors 118 are located within IMU 116.

Locators 114 are located in fixed positions on front rigid body 205 relative to one another and relative to reference point 215. In this example, reference point 215 is located at the center of IMU 116. Each of locators 114 emits light that is detectable by imaging device 160. Locators 114, or portions of locators 114, are located on front side 220A, top side 220B, bottom side 220C, right side 220D, and left side 220E of front rigid body 205, as shown FIG. 2A.

Figure 2B:
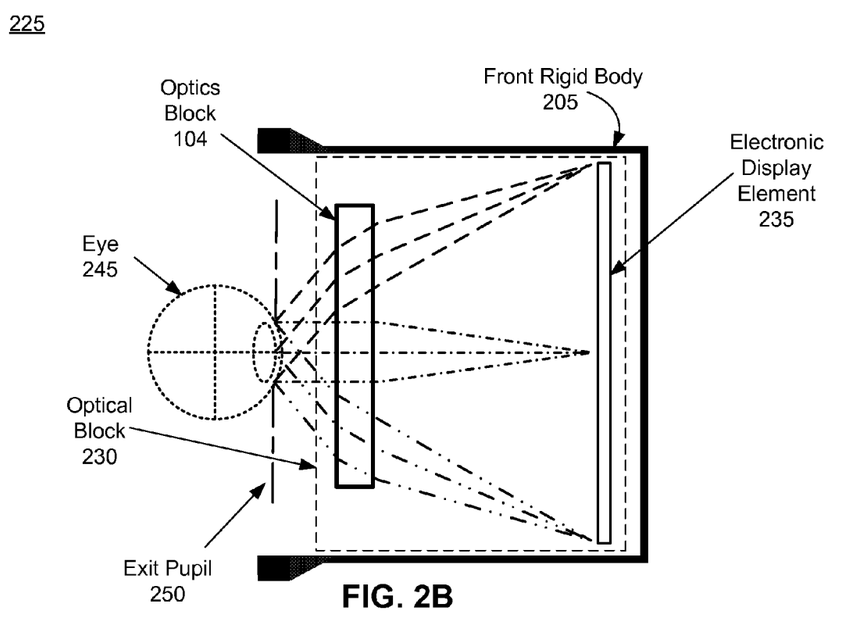
FIG. 2B is a cross section of a front rigid body of the VR headset in FIG. 2A, in accordance with an embodiment.

FIG. 2B is a cross section 225 of front rigid body 205 of the embodiment of VR headset 200 shown in FIG. 2A. As shown in FIG. 2B, front rigid body 205 includes optical block 230 that provides altered image light to exit pupil 250. Exit pupil 250 is the location of front rigid body 205 where user's eye 245 is positioned. For purposes of illustration, FIG. 2B shows a cross section 225 associated with a single eye 245, but another optical block, separate from optical block 230, provides altered image light to another eye of the user. Optical block 230 includes electronic display element 235 of electronic display 102 and optics block 104. Electronic display element 235 emits image light toward optics block 104. Optics block 104 magnifies the image light, and in some embodiments, also corrects for one or more additional optical errors (e.g., distortion, astigmatism, etc.). Optics block 104 directs the image light to the exit pupil 250 for presentation to the user.

Figure 3:
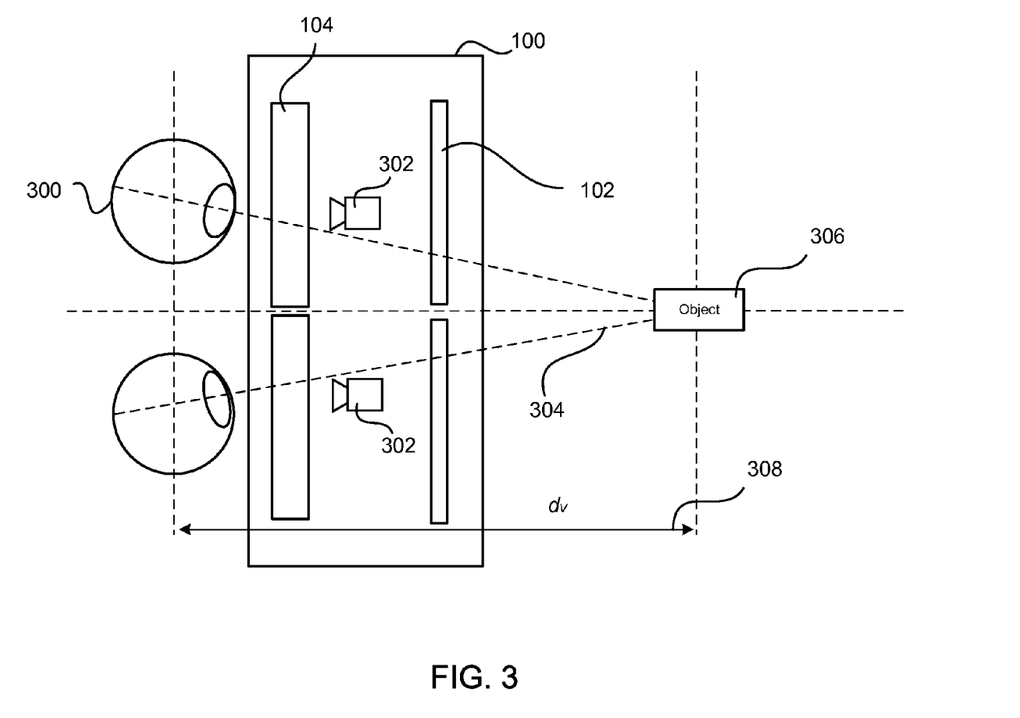
FIG. 3 shows a cross section of a headset including a camera for tracking eye position, in accordance with at least one embodiment.

FIG. 3 shows a cross section of a headset e.g., headset 100 or a HMD in some other system (e.g., an AR system) including a camera for tracking eye position, in accordance with at least one embodiment. The headset includes two separate cameras 302, one camera for tracking the position of each eye 300. In the example shown in FIG. 3, cameras 302 captures images of the user's eyes and eye tracking module 110 determines gaze lines 304 corresponding to a location where the user is looking based on the captured images. Here, the user is looking at object 306.

In one embodiment, eye tracking module 110 performs eye tracking by focusing a camera on one or both of the user's eyes and records their movements as the user looks at some kind of stimulus. The stimulus can be light sources that emit light in either infrared, near-infrared, visible light, or some combination thereof. Eye tracking module 110 tracks the center of the eye's pupil by capturing eye images at a rate of, for example, 60-300 times per second, and inferring the pupil location from the images using a computer algorithm. Eye tracking module 110 may use any of the known techniques in the art for determining the user's gaze direction for each of the user's eyes.

Eye tracking module 110 estimates an intersection of gaze lines 304 corresponding to each of the user's eyes by extrapolating the gaze lines 304 until they both intersect. Eye tracking module 110 then determines a vergence depth ($d_v$) 308 for the user based on the estimated intersection of gaze lines 304. As shown in FIG. 3, gaze lines 304 converge or intersect at a depth $d_v$ 308, where object 306 is located. The vergence depth ($d_v$) 308 is a distance between the location of the eyes and the point of intersection of the gaze lines 304. The location of the eyes can be either the location of the exit pupil (e.g., exit pupil 250) in the headset or a center of a sphere approximating the user's eye (e.g., sphere 300). In FIG. 3, the location of the eyes is the center of the sphere 300.

Under normal conditions when a user is viewing an object, human eyes automatically adjust themselves to bring vergence and accommodation into correspondence such that the vergence depth matches the focal distance of the eyes. Focal distance is a distance from the user's eye to a virtual image of an object displayed on an electronic display (e.g., electronic display element 235). The focal distance depends on a distance from the lens of the headset to the display and can be varied by, for example, changing a position of the electronic display. Vergence is the simultaneous rotation of both eyes in opposite directions to obtain or maintain single binocular vision and is connected to accommodation of the eye. In some cases, there is a difference between the vergence depth and focal length such that the user's eyes cannot verge and accommodate at the same time, which is referred herein as a "vergence-accommodation conflict." Vergence-accommodation conflict is described in detail below in conjunction with FIGS. 4A and 4B.

Headset 100 mitigates the vergence-accommodation conflict using the estimated vergence depth ($d_v$) 308 based on the estimated intersection of gaze lines 304. In some cases, gaze lines 304 do not intersect and are an approximation based on the location of the user's eyes. In such cases, the vergence depth ($d_v$) 308 estimated from the gaze lines 304 may be further refined or filtered using geometric data for the virtual scene presented by headset 100. While it might be useful to refine or filter the estimated vergence depth ($d_v$) 308 to calculate the true vergence depth by, for example, refining or filtering using geometric data, any such refining or filtering of the estimated vergence depth ($d_v$) 308 takes up additional resources and timing budget. In some embodiments, headset 100 mitigates the vergence-accommodation conflict using the estimated vergence depth ($d_v$) 308 without refining or filtering using geometric data for the virtual scene. In such embodiments, an actuation time for the motors controlling the distance between electronic display 102 and optics block 104 is reduced by removing a dependency on the vergence processing module 112 estimating the true vergence depth. Alternatively, headset 100 mitigates the vergence-accommodation conflict by refining or filtering the estimated vergence depth ($d_v$) 308 from the gaze lines 304 using geometric data for the virtual scene presented by headset 100. An example scenario where a human eye experiences a vergence-accommodation conflict is described in detail below in conjunction with FIGS. 4A and 4B.

Figure 4A:
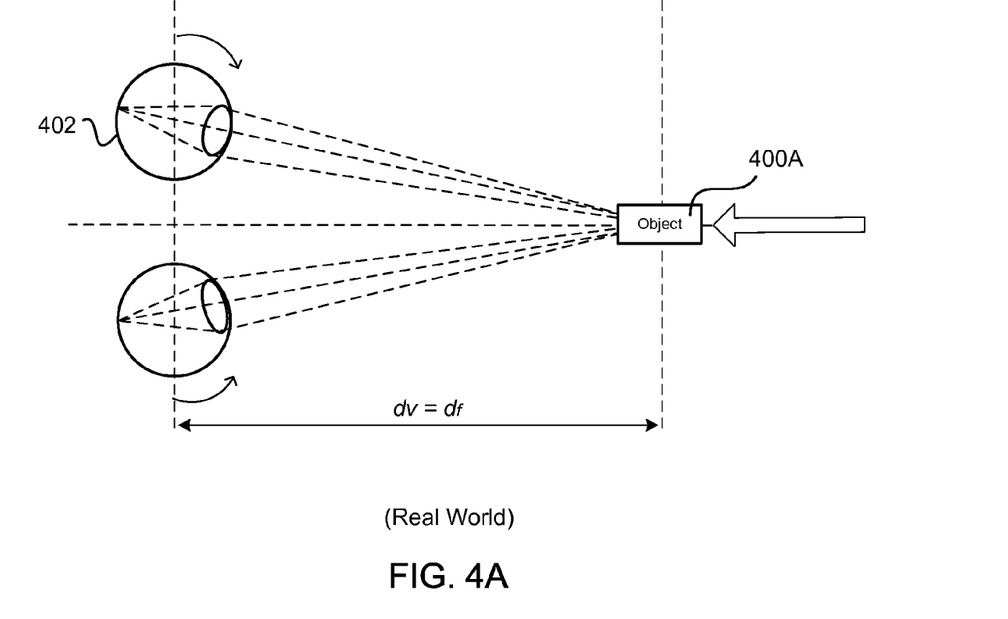
FIG. 4A shows the relationship between vergence and eye focal length in the real world.

FIG. 4A shows an example of how the human eye experiences vergence and accommodation in the real world. In the example of FIG. 4A, the user is looking at real object 400A (i.e., the user's eyes are verged on real object 400A and gaze lines from the user's eyes intersect at real object 400A.). As real object 400A is moved closer to the user, as indicated by the arrow in FIG. 4A, each eye 402 rotates inward to stay verged on real object 400A. As real object 400A gets closer, eye 402 must "accommodate" for the closer distance by reducing the focal length of eye's lens by changing its shape. Thus, under normal conditions in the real world, the vergence depth ($d_v$) equals the focal distance ($d_f$).

Figure 4B:
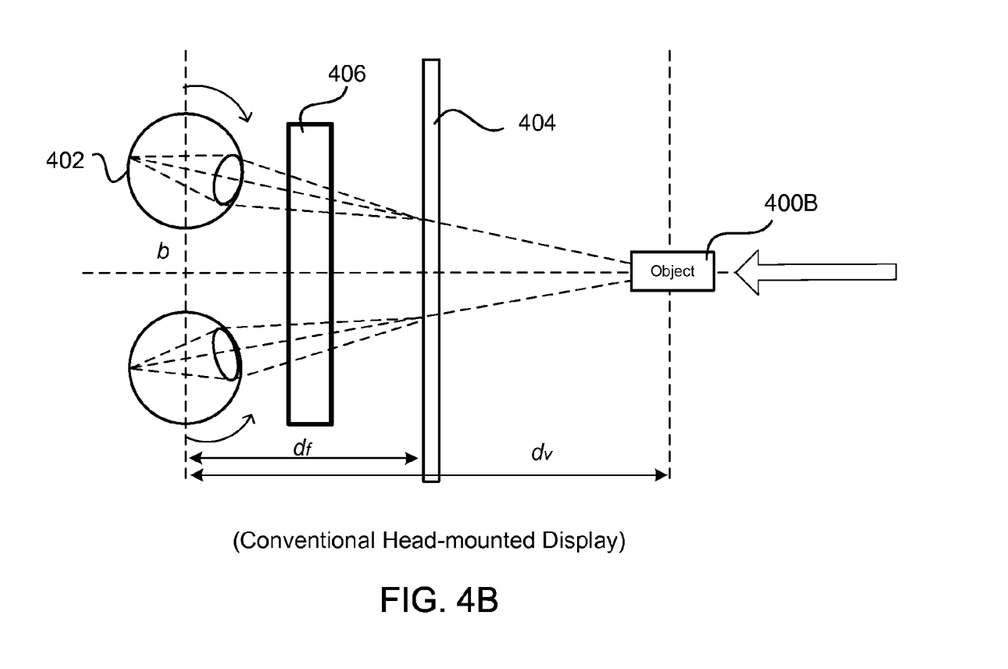
FIG. 4B shows the conflict between vergence and eye focal length in a three-dimensional display.

However, FIG. 4B shows an example conflict between vergence and accommodation that can occur in conventional HMDs. In this example, a user is looking at an object 400B displayed on electronic screen (not shown for simplicity) of the conventional HMD. The user is looking through an optical system 406 to view the electronic screen, accordingly, the user sees a virtual image 404 of the electronic screen. However, the user's eyes are verged on and gaze lines from the user's eyes intersect at virtual object 400B, which is at a greater distance from the user's eyes than the virtual image created by the optical system 406 from the real image displayed on the electronic screen. As virtual object 400B is rendered on electronic display to appear closer to the user, each eye 402 again rotates inward to stay verged on virtual object 400B, but the focal length of each eye is not reduced; hence, the user's eyes do not accommodate as in FIG. 4A. Thus, instead of reducing the eye's focal length to accommodate for the closer vergence depth, eye 402 maintains accommodation at a distance associated with the virtual image of the electronic screen. Thus, the vergence depth ($d_v$) often does not equal the focal distance ($d_f$) for the human eye for objects displayed on conventional electronic displays. This discrepancy between vergence depth and focal distance is a vergence-accommodation conflict. A user experiencing only vergence or accommodation and not both in correct correspondence might experience some degree of double vision, image blur, fatigue, and even nausea, which is undesirable in VR systems and/or AR HMDs. Changes in accommodation for an electronic screen in a HMD may be implemented in the HMD by dynamically adjusting the position of the electronic screen to vary the distance between the electronic screen and an optics block of the HMD. Alternatively or additionally, vergence-accommodation conflict may be mitigated by dynamically adjusting the position of the optics block to vary the distance between the electronic screen and an optics block of the HMD. An example system for adjusting the position of electronic display of a HMD is described below in conjunction with FIGS. 5A and 5B.

Figure 5A:
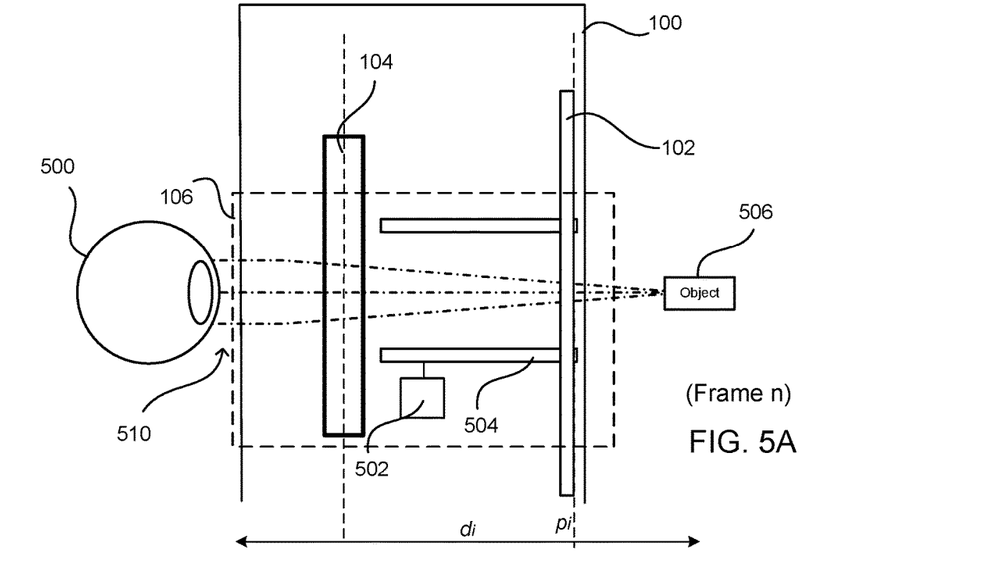
FIGS. 5A and 5B show an example system for adjusting the location of electronic display of a headset, in accordance with at least one embodiment.

FIG. 5A shows an example of a headset e.g., headset 100 or a HMD in some other system (e.g., an AR system) displaying frame n of a virtual scene for the user 500. In this example, the virtual scene includes object 506 displayed on electronic display 102 at which the gaze of user 500 is directed (i.e., verged). A virtual image of object 506 is located at a virtual distance $d_i$, behind electronic display 102, from exit pupil 510. In the example of FIG. 5A, electronic display 102 is in position $p_i$, which provides accommodation for distance $d_i$ to enable comfortable viewing of object 506.

Figure 5B:
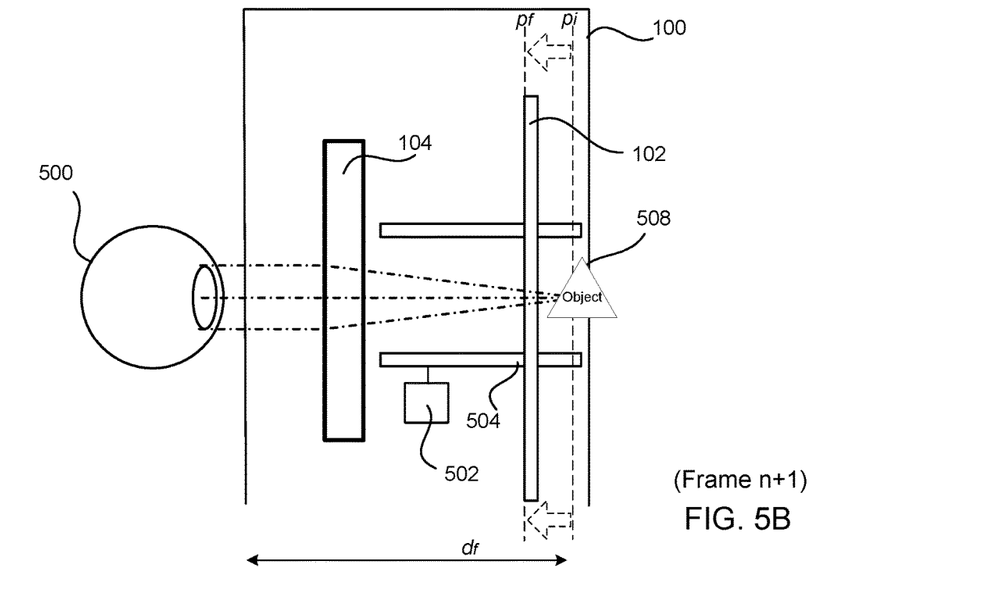

FIG. 5B shows the headset displaying frame n+1 of the virtual scene. In this example, user 500 may have repositioned its eyes to look at object 508 that is different from object 506 (or object 506 might have quickly moved toward user 500 between frames n and n+1) in the virtual scene and is closer in its virtual distance than that of object 506. In response to the change in the location of object on the electronic display 102 that the user is looking at (i.e., object 506 in frame n and object 508 in frame n+1, which is closer than object 506), eyes of user 500 rotate inward to verge on object 508, causing vergence processing module 112 to determine a new vergence depth $d_f$ for frame n+1 and to provide the new vergence depth $d_f$ to distance actuation block 106. Distance actuation block 106 includes distance element 502, such as an actuator or motor and track 504, but may also include other components enabling electronic display 102 to move along track 504 to dynamically adjust the distance between electronic display 102 and optics block 104. Based on the new vergence depth $d_f$, distance element 502 moves electronic display 102 from position $p_i$ to new position $p_f$ to accommodate user 500 at the new vergence depth $d_f$ for object 508. In one embodiment, the delta between position $p_i$ and position $p_f$ is a few millimeters.

In one embodiment, each position of electronic display 102 provides accommodation for a range of vergence depths. For example, a position $p_i$ may provide accommodation for a range of vergence depths $d_1$ through $d_2$, such that a range of all possible vergence depths while the user is viewing content on electronic display 102 may be mapped to a few discrete positions (e.g., three positions) of electronic display 102. And each vergence depth corresponds to an object distance, where the object distance is a distance between optics block 104 and virtual object (e.g., object 506 or object 508) that is currently being viewed by the user.

Accordingly, a mapping between vergence depths (or object distances) and positions of electronic display 102 may be stored in a lookup table. For example, the lookup table may store mapping between all possible vergence depths (or object distances) to possible positions of electronic display 102. In one embodiment, three positions of electronic display 102 may be sufficient to mitigate vergence-accommodation conflict for all possible vergence depths. Thus, when a vergence depth value is received from vergence processing module 112, distance actuation block 106 moves electronic display 102 to a position based on the lookup table. While a lookup table typically includes a mapping between discrete values of vergence depths (or object distances) and discrete positions of electronic display 102, distance actuation block 106 may include a control module that may control the position of electronic display 102 based on a mapping between discrete values of positions of electronic display 102 and a continuous range of vergence depths. For example, the control module maps a position $p_i$ for providing accommodation for a continuous range of vergence depths $d_1$ through $d_2$.

In many instances, HMD systems (e.g., VR systems and/or AR systems) aim to present users with a virtual environment that closely simulates a real world environment or provides users with content causing the users to get lost in the illusion created by the HMD systems. To provide users with a realistic or captivating virtual environment, a HMD system implements multiple systems and methods discussed herein to operate together at efficiencies that are imperceptible to a user. For example, transition delays are particularly costly to user experience with HMD systems. If a user is waiting for the virtual scene presented by a HMD to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

Referring back to FIGS. 5A and 5B to provide accommodation for a new vergence depth while also leaving time to perform additional calculations without users perceiving a delay, a speed at which distance element 502 moves electronic display 102 is limited by a rate at which the human eye performs accommodation. For example, assuming human eye accommodation has a 10 diopter/sec peak velocity, a 100 diopter/sec$^2$ peak acceleration, and changing the distance between electronic display 102 and optics block 104 moves a virtual image about 0.6 diopters/mm, distance element 502 operates with a minimum velocity of 10/0.6=16.6 mm/sec and a minimum acceleration of 100/0.6=166.6 mm/sec$^2$ acceleration to prevent a user from perceiving the repositioning of electronic display 102 relative to optics block 104. There are commercially available actuators satisfying the preceding values, with the Compact Linear Positioning Stage (M-663) by Physik Instrumente (PI) as an example actuator.

Method for Mitigating Vergence-Accommodation Conflict

Figure 6:
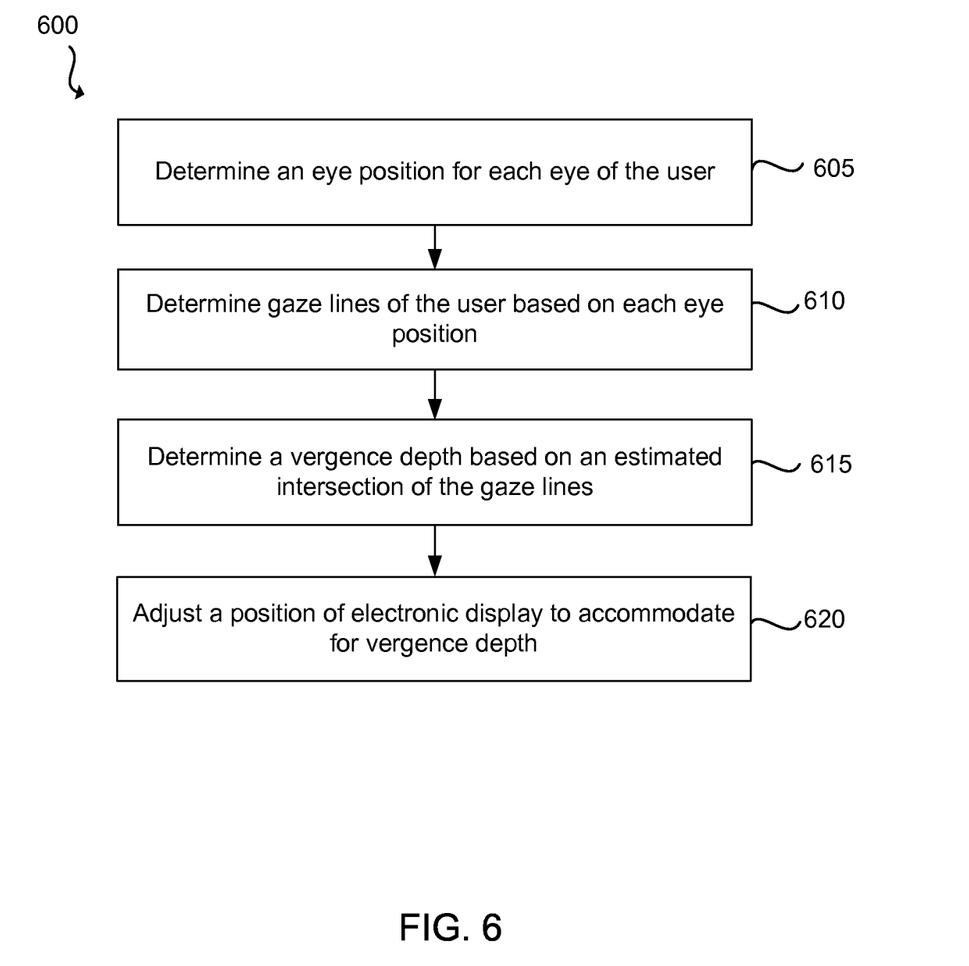
FIG. 6 shows an example process for mitigating vergence-accommodation conflict by adjusting the location of electronic display of a headset, in accordance with at least one embodiment.

FIG. 6 shows a flowchart of an example process 600 for mitigating vergence-accommodation conflict by adjusting the location of an electronic display (e.g., electronic display 102) of a headset e.g., headset 100 or a HMD in some other system (e.g., an AR system). As discussed above, the headset system may dynamically vary the distance between the electronic display and an optics block (e.g., optics block 104) to bring images presented to a user wearing the headset into focus, which keeps the user's eyes in a zone of comfort as vergence and accommodation change. The example process 600 of FIG. 6 may be performed by one or more components of the headset (e.g., headset 100 or some other HMD such as an AR headset). Likewise, embodiments may include different and/or additional steps, or perform the steps in different orders.

The headset tracks a location of the user's eyes while the user is viewing content on the headset to determine 605 an eye position for each eye of the user. For example, the headset determines 605 the eye position by estimating a position of a pupil of each of the user's eyes. The pupil position may be estimated, for example, by capturing images including corneal reflections in response to the user looking at a light stimulus as described above in conjunction with FIG. 3. For example, the estimated position is the center of each eye.

The headset determines 610 gaze lines for each of the user's eyes based on the position of the pupils in the images captured by the eye-tracking cameras (e.g., cameras 302). The pupil positions are mapped from the coordinates (measured in pixels) of the captured images to degrees of visual angles (azimuth and elevation in VR space) using calibration data collected once for each user. The calibration procedure may be in the form of looking at an object (e.g., a butterfly) moving around in VR space. The user is instructed to follow the object smoothly with his eyes for some time. The calibration procedure establishes a mapping between the pupil positions measured in pixels and the corresponding known VR locations of the object measured in degrees of visual angle. The mapping can be later interpolated to cover VR locations where the moving object was not observed. The mapping is used to determine the degree of visual angles of where the user is looking for the pupil positions of the captured images, which is then used to determine the gaze lines.

The headset determines 615 a vergence depth based on an estimated intersection of the gaze lines for both the user's eyes. For example, a vergence processing module (e.g., vergence processing module 112 of headset 100) determines the vergence depth as a distance from the location of the user's eye to a location where the user's eyes reach a state of vergence. In one embodiment, the vergence processing module triangulates the gaze lines to estimate a distance or depth from the user's eyes that are associated with intersection of the gaze lines. For example, the location of each of the user's eyes is known (e.g., pupil location from the captured images) and gaze lines along with the determined 615 gaze directions. The intersection of the gaze lines is estimated by assuming the location of the user's eyes as two vertices of a triangle and the gaze lines from the two eyes as the two edges of the triangle originating from the two vertices representing the eyes and converging at the third vertex of the triangle. The third vertex of the triangle represents the intersection of the gaze lines and a distance between the triangle edge between the two vertices representing the eyes and the third vertex representing the intersection of the gaze lines (i.e., altitude of the triangle) is the estimated vergence distance.

The headset adjusts 620 a position of the electronic display of the headset (e.g., electronic display 102 of headset 100) to accommodate for the estimated vergence depth. For example, when the user who is viewing (e.g., focusing) on an object in one frame (e.g., frame n) and views either a different object or the virtual depth of the object changes in the next frame (e.g., frame n+1), the headset determines 615 a vergence depth for the object viewed by the user in frame n+1. A distance element of the headset (e.g., distance element 502 of distance actuation block 106), such as an actuator or motor and track (e.g., track 504), moves the electronic display along the track based on the determined vergence depth. Alternatively or additionally, the distance element of the headset moves the optics block (e.g., optics block 104) for reducing the vergence-accommodation conflict by adjusting the distance between the 3D electronic screen and an optics block of the headset. As discussed above in conjunction with FIG. 5B, each vergence depth may be mapped to a position of the electronic display and stored in a lookup table. After determining the vergence depth for a particular frame, the distance element moves the electronic display to a position based on the lookup table.

In some embodiments, a mapping between vergence depths (or object distances) and positions of the electronic display may be stored in a lookup table. For example, the lookup table may store mapping between all possible vergence depths (or object distances) to possible positions of the electronic display. In one embodiment, three positions of the electronic display may be sufficient to mitigate vergence-accommodation conflict for all possible vergence depths. Thus, when a vergence depth value is received from the vergence processing module, the distance element moves the electronic display to a position based on the lookup table. While a lookup table typically includes a mapping between discrete values of vergence depths (or object distances) and discrete positions of the electronic display, the distance element may include a control module that may control the position of the electronic display based on a mapping between discrete values of the positions of the electronic display and a continuous range of vergence depths.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A headset comprising:
    at least one processor;
    an electronic display element configured to display content;
    an optics block configured to present the content to a user, the presented content at an image distance of a plurality of image distances from the optics block, the image distance based in part on an adjustable distance between the electronic display element and the optics block;
    an eye tracking system including an image capturing element, the eye tracking system configured to determine an eye position of each eye of the user and gaze lines for each eye of the user; and
    a distance actuation block configured to:
        determine a vergence depth for the user based on an estimated intersection of the gaze lines for each eye of the user, and
        dynamically change by the distance actuation block the adjustable distance between the optics block and the electronic display element by changing a position of the electronic display element along an axis, wherein the axis is perpendicular to a light emitting surface of the electronic display element and the optics block, wherein the change in position of the electronic display element is based at least in part on the vergence depth, and each position of the electronic display element is associated with a corresponding image distance, of the plurality of image distances, and wherein
            a velocity at which the distance actuation block moves the electronic display element is at least: a peak accommodation velocity associated with a first eye of the user multiplied by the adjustable distance divided by a corresponding change in refractive power over the adjustable distance, and
            an acceleration at which the distance actuation block moves the electronic display element is at least: a peak accommodation acceleration associated with the first eye multiplied by the adjustable distance divided by the corresponding change in the refractive power over the adjustable distance.

2. The headset of claim 1, wherein the vergence depth corresponds to a distance from a location of the user's eyes to a location where the user's eyes reach a state of vergence, the state of vergence representing a simultaneous movement of both of the user's eyes in opposite directions to maintain single binocular vision.

3. The headset of claim 1, wherein the distance actuation block is configured to change the position of the electronic display element based on a lookup table, the lookup table comprising a mapping between discrete positions of the electronic display element and discrete vergence depths.

4. The headset of claim 3, wherein the lookup table comprises three discrete positions of the electronic display element that map to the discrete vergence depths.

5. The headset of claim 1, wherein the distance actuation block is configured to change the position of the electronic display element based on a mapping between discrete positions of the electronic display element and vergence depths, wherein each discrete position of the electronic display element maps to a continuous range of vergence depths.

6. The headset of claim 1, wherein the distance actuation block is configured to change the distance between the optics block and the electronic display element to mitigate vergence-accommodation conflict, the vergence-accommodation conflict representing a discrepancy between the vergence depth and a focal distance for the displayed content.

7. The headset of claim 1, wherein the distance actuation block is configured to change the distance between the optics block and the electronic display element by changing a position of the optics block.

8. The headset of claim 1, wherein the headset is either a virtual reality headset or an augmented reality headset.

9. A headset comprising:
    an electronic display configured to display content;
    an optics block configured to present the content to a user, the presented content at an image distance of a plurality of image distances from the optics block, the image distance based in part on an adjustable distance between the electronic display element and the optics block;
    an eye tracking system configured to determine an eye position for each eye of a user and gaze lines for each eye of the user; and
    a distance actuation block configured to:
        determine a vergence depth corresponding to an intersection of the gaze lines, and
        dynamically change by the distance actuation block the adjustable distance between the optics block and the electronic display element by changing a position of the electronic display element along an axis, wherein the axis is perpendicular to a light emitting surface of the electronic display element and the optics block, wherein the change in position of the electronic display element is based at least in part on the vergence depth, and each position of the electronic display element is associated with a corresponding image distance, of the plurality of image distances, and wherein
            a velocity at which the distance actuation block moves the electronic display element is at least: a peak accommodation velocity associated with a first eye of the user multiplied by the adjustable distance divided by a corresponding change in refractive power over the adjustable distance, and
            an acceleration at which the distance actuation block moves the electronic display element is at least: a peak accommodation acceleration associated with the first eye multiplied by the adjustable distance divided by the corresponding change in the refractive power over the adjustable distance.

10. The headset of claim 9, wherein the distance actuation block is configured to change the position of the electronic display element based on a lookup table, the lookup table comprising a mapping between discrete positions of the electronic display element and discrete vergence depths.

11. The headset of claim 9, wherein the distance actuation block is configured to change the distance between the optics block and the electronic display element to mitigate vergence-accommodation conflict, the vergence-accommodation conflict representing a discrepancy between the vergence depth and a focal distance for the displayed content.

12. A method comprising:
   displaying content via a headset that directs light from an electronic display element presenting the content to an exit pupil of the headset via an optics block configured to present the content to a user, the presented content at an image distance of a plurality of image distances from the optics block, the image distance based in part on an adjustable distance between the electronic display element and the optics block;
   determining an eye position for each eye of the user and gaze lines for each eye of the user via images of each eye of the user captured by an eye tracking system included in the headset;
   determining a vergence depth for the user based on an estimated intersection of the gaze lines for each eye of the user and the eye position of each eye of the user; and
   dynamically adjusting by a distance actuation block the adjustable distance between the optics block and the electronic display by changing a position of the electronic display element along an axis, wherein the axis is perpendicular to a light emitting surface of the electronic display element and the optics block based at least in part on the determined vergence depth for the user, and each position of the electronic display element is associated with a corresponding image distance, of the plurality of image distances, and wherein
      a velocity at which the distance actuation block moves the electronic display element is at least: a peak accommodation velocity associated with a first eye of the user multiplied by the adjustable distance divided by a corresponding change in refractive power over the adjustable distance, and
      an acceleration at which the distance actuation block moves the electronic display element is at least: a peak accommodation acceleration associated with the first eye multiplied by the adjustable distance divided by the corresponding change in the refractive power over the adjustable distance.

13. The method of claim 12, wherein changing a position of the electronic display element is based on a lookup table, the lookup table comprising a mapping between discrete positions of the electronic display element and discrete vergence depths.

14. The method of claim 12, wherein adjusting the distance between the optics block and the electronic display based at least in part on the determined vergence depth for the user mitigates a vergence-accommodation conflict, the vergence-accommodation conflict representing a discrepancy between the vergence depth and a focal distance for the displayed content.

15. The method of claim 12, wherein the vergence depth is determined by computing a distance from a location of the user's eyes to a location where the user's eyes reach a state of vergence, the state of vergence representing a simultaneous movement of both of the user's eyes in opposite directions to maintain single binocular vision.

16. The method of claim 12, wherein the changing of the position of the electronic display element is based on a mapping between discrete positions of the electronic display element and vergence depths, wherein each discrete position of the electronic display element maps to a continuous range of vergence depths.

17. The method of claim 12, wherein adjusting the distance between the optics block and the electronic display based at least in part on the determined vergence depth for the user comprises:
   changing a position of the optics block.

18. The headset of claim 1, wherein actual gaze lines of a user do not intersect, and the estimated intersection of the gaze lines for each eye of the user is based on an approximation of a location of each eye of the user.

19. The headset of claim 18, wherein the determined vergence depth is determined based in part on geometric data for the displayed content to the user wearing the headset.

20. The headset of claim 1, wherein the distance actuation block is configured to:
   refine the determined vergence depth using geometric data for the displayed content to the user wearing the headset.

* * * * *